United States Patent [19]

Perdahl et al.

[11] 4,072,504
[45] Feb. 7, 1978

[54] METHOD OF PRODUCING METAL FROM METAL OXIDES

[75] Inventors: Örn Gunnar Perdahl, Lulea; Sven Oscar Santen, Hofors, both of Sweden

[73] Assignee: Aktiebolaget Svenska Kullagerfabriken, Goteborg, Sweden

[21] Appl. No.: 669,863

[22] Filed: Mar. 24, 1976

Related U.S. Application Data

[63] Continuation of Ser. No. 435,520, Jan. 22, 1974, abandoned.

[30] Foreign Application Priority Data

Jan. 26, 1973 Sweden .................................. 7301099

[51] Int. Cl.$^2$ ................................................ C21B 11/00
[52] U.S. Cl. ................................................ 75/40; 75/21;
 75/38; 75/41; 266/182
[58] Field of Search .................... 75/40, 38, 11, 10 R, 75/41, 21, 42; 266/182

[56] References Cited

U.S. PATENT DOCUMENTS

| | | | |
|---|---|---|---|
| 833,406 | 10/1906 | Mason | 75/40 |
| 2,555,507 | 6/1951 | Pratt | 75/11 |
| 3,236,628 | 2/1966 | Bogdandy | 75/38 |
| 3,282,678 | 11/1966 | Melcher et al. | 75/41 |
| 3,301,661 | 1/1967 | McGlynn et al. | 75/40 |
| 3,502,461 | 3/1970 | Guttler et al. | 75/10 |
| 3,634,064 | 1/1972 | Vedensky et al. | 75/38 |
| 3,864,122 | 2/1975 | Seelig et al. | 75/11 |
| 3,894,864 | 7/1975 | Langhammer | 75/11 |
| 3,936,296 | 2/1976 | Campbell | 75/38 |
| 3,963,483 | 6/1976 | Mathesius et al. | 75/11 |
| 3,970,290 | 7/1976 | Santen et al. | 75/11 |

Primary Examiner—Walter R. Satterfield
Attorney, Agent, or Firm—Finnegan, Henderson, Farabow & Garrett

[57] ABSTRACT

The present invention relates to a method for producing metal from metal oxides, especially iron from iron oxides by a pre-reduction as well as final reduction wherein the pre-reduced oxidic material as well as optional slag formers and optional recirculated gas are injected at the bottom through tuyeres or the like by means of a carrier gas, inert or reducing of a reactor resembling a shaft furnace filled with solid reducing agent during simultaneous supplying of energy, e.g. in the form of oxygen gas and hydrocarbon, the oxidic material being blown against a pillar of solid reducing agent at such a level that essentially all injected solid material is retained (e.g. by galling) on the lower end of the pillar to bring the oxidic material to instantaneous final reduction, melting and possible alloying of the reduced metal.

6 Claims, 1 Drawing Figure

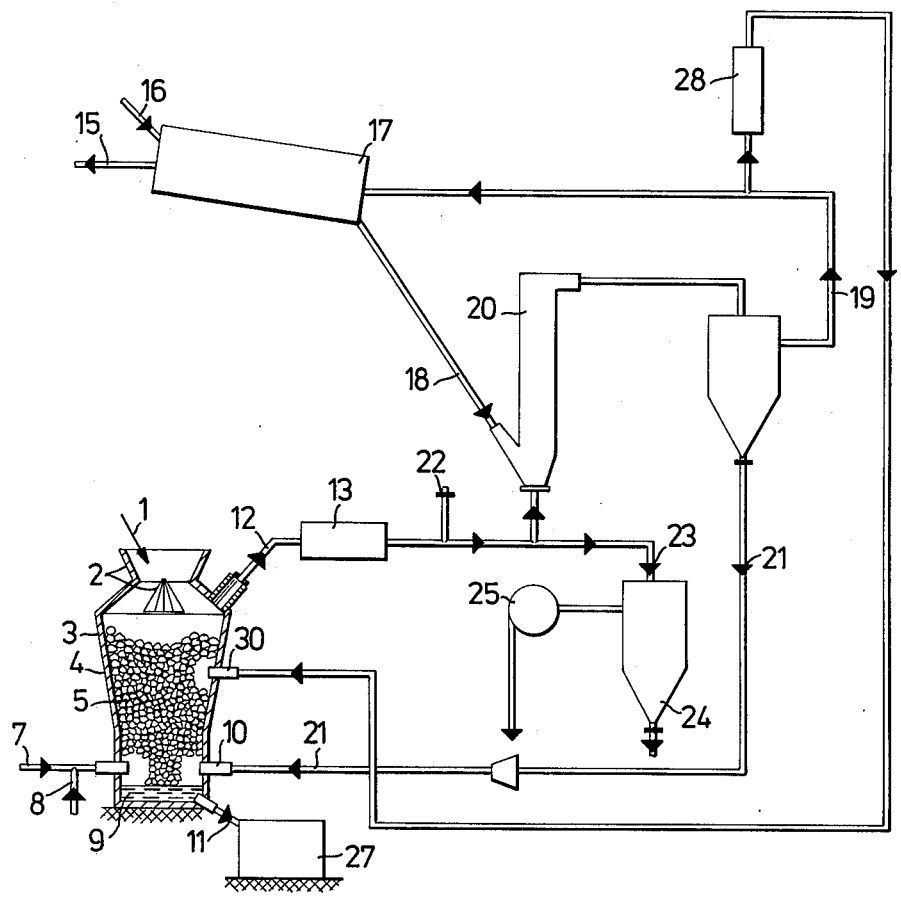

METHOD OF PRODUCING METAL FROM METAL OXIDES

This is a continuation of application Ser. No. 435,520, filed Jan. 22, 1974 and now abandoned.

The present invention relates to a method of producing metal from metal oxides, especially iron from iron oxides, and also intends to avoid or reduce the difficulties and problems involved in the processes known up to now for producing metal, e.g. iron in the form of pig iron.

It is generally known to bring an oxide material into contact with a reduction agent at an appropriate temperature and in this manner reduce out the metal from the oxide material.

Today there are essentially three methods of carrying out reduction of iron oxides, namely with: the sponge iron, the melt reduction and the blast furnace processes.

In the sponge iron process the reduction is done with essentially gaseous reduction agents, at a temperature which is lower than the melting points of the starting material and the final product. Its disadvantages are that relatively large amounts of gas are required to obtain a product with a high degree of reduction and that the final product is cold and is often inclined to oxidize. Furthermore the speed of reduction is relatively low due to the low working temperature.

In the melt process the reduction is done at a temperature which is higher than the melting points of the products. The disadvantages with this process are primarily the high heat load when the reaction heat is to be transferred to the molten or the half molten phase, and the relatively high consumption of reducing agent depending on poor use of the carbon monoxide at high temperatures.

The disadvantages of the blast furnace process are primarily that it demands a pre-treated charge and that it makes great demands on the strength of the reduction agent used, the coke. Furthermore the blast furnace requires extensive peripheral equipment for, for example, the supply of hot air blast.

All of these disadvantages are avoided in the present invention, whereby in the production of metal from metal oxides, especially iron from iron oxides one makes use of an optional pre-reduction and a final reduction, the process being characterized in that the optional pre-reduced oxidic material as well as optional slag formers and optional recirculated gas are injected at the bottom through tuyeres or the like by means of a carrier gas, inert or reducing in a reactor resembling a shaft furnace, filled with solid reducing agent during simultaneous supplying of energy, e.g. in the form of oxygen gas and hydrocarbon. The oxidic material is blown in against a pillar of solid reducing agent at such a level, that essentially all injected solid material is retained (e.g. by galling) on the lower end of the pillar in order to bring the oxidic material to instantaneous final reduction, melting and possible alloying of the metal so reduced.

As a reducing agent in the optional pre-reduction there is used with advantage gas from the upper portion of the reactor consisting primarily of a mixture of carbon monoxide and hydrogen.

At a desired high degree of pre-reduction, it is possible that it would be necessary to add an extra amount of reduction gas, consisting of hydrocarbon or specially produced reduction gas, to the reactor in order to increase the amount of gas coming from the reactor, in order to achieve the desired high degree of pre-reduction.

Furthermore the method according to the invention is to a certain degree self-regulating in that when the degree of reduction in the pre-reduction step is lowered, the outgoing amount of gas from the reactor is automatically increased, causing an increase in the degree of reduction in the pre-reduction, at a constant temperature in the lower portion of the shaft at the injection level.

Conversely, when the degree of reduction is high in the pre-reduction step the amount of gas formed in the shaft will automatically be reduced causing a lowering in the pre-reduction step, this also being at constant temperature in the lower portion of the shaft at the level of injection.

Since the reduction gases taken from the reactor have relatively high temperatures, they are temperature controlled according to the invention with the help of a heat exchanger to a temperature which is appropriate for pre-reduction, the pre-reduction of course being able to be carried out in one or more steps according to known processes, e.g. in a fluidized bed.

As was mentioned above the supply of energy can be effected for example by means of oxygen gas and hydrocarbons or also by electrical energy with the help of conventional electrodes or by means of a plasma burner. The solid reducing agent of course serves a dual purpose, as is known on the one hand as a reducing agent for the actual reduction and on the other hand as a fuel.

With the method according to the invention most known oxide ores can be reduced, e.g. ores of tungsten, chromium, manganese or nickel or a mixture of one or more of these and/or iron ores, whereby, depending on the material introduced into the reactor, pure or alloyed metal can be obtained.

The invention will be described in more detail with reference to the accompanying schematic drawing, which shows a schematic representation of an arrangement for carrying out the method according to the invention. The manufacture of pig iron is taken as an example, but a man skilled in the art will easily see, as was mentioned above, that the method according to the present invention can also be used on other oxide ores than iron ores.

The enclosed drawing shows a final reduction step consisting of a reactor 2, 3, 4 resembling a shaft furnace, which is supplied at the top with solid reducing agent, in this case carbon 1,5, e.g. coke, through a gas-tight lock 2. The pre-reduced oxidic material 21 is blown into the bottom of the reactor through tuyeres 10 with the aid of an inert or reducing gas 21. At the same time oxygen gas 2 and hydrocarbon 7 are blown in, preferably in the tuyeres 10. The final reduction and the melting occurs instantaneously and the molten metal 9, in this case the iron, flows to the bottom during a simultaneous carburization. From here the pig iron produced and the slag can be tapped continuously or intermittantly through a tap hole 11. The reactor can be provided with a borehearth 27 for metallurgical treatment of the product obtained.

The temperature of the reactor is controlled by means of oxygen and possibly water, or also with the help of electrical energy supplied for example by means of a plasma burner, resistively with graphite electrodes. The reactor wall can be one of the phases.

The reactor and the coke bed are dimensioned so that:
  a. the injected pre-reduced material is caught up in the hot lower portion of the coke bed 5.
  b. the outgoing reactor gas 12 consists of a mixture of carbon monoxide and hydrogen in high concentration.

The ratio $CO/H_2$ is controlled by the hydrocarbon addition 7 in the lower portion of the reactor and also of course by the height of the coke bed 5 in the reactor.

The hot reduction gas 12 coming out of the reactor is temperature controlled with the aid of a heat exchanger 13 to a temperature which is appropriate for the pre-reduction step 18, 20. The pre-reduction can be done in one or more steps according to known methods, e.g. in a fluidized bed 20.

A suitable degree of pre-reduction for the oxidic material is 60-95%. If the degree of reduction were above 90% the reduction gas from the reactor would probably not be sufficient because of the reduced heat load in the reactor and the reduced consumption for final reduction, and therefore reduction gas from a separate source 22, e.g. a gas generator, must be provided.

The outgoing gas 19 from the pre-reduction step 20 still contains a relatively large amount of combustible gases and can therefore be used, on the one hand for pre-heating and drying 17 of ingoing oxidic material 16 and on the other hand in the gas generator 22, or after possible removal of water 28 be reintroduced into the final reduction reactor at a somewhat higher level 30 than the reaction zone of the reactor, whereby the exhaust temperature of the reactor will also be lowered and the need for an extra heat exchanger 13 will be reduced.

The oxidic material going into the reactor, in this case iron ore, is preferably fine grained and can be in the form of ore concentrate or a mixture of concentrate and dust separated from exhausts from, for example, other metallurgical processes which cause air pollution problems.

As a carrier gas when injecting the pre-reduced material 21 one can use advantageously a small amount of the reactor gas 23, which has been purified in an appropriate cleaner or filter 24 and is transported by means of a fan 25.

The exhausts from the drying device 17 are preferably led off to the smoke stack via the conduit 15.

A number of tests have been performed with iron ore and in these, the various alternative processes for carrying out the method according to the invention have been tried.

EXAMPLE 1

In this test the input material was coke, oxygen gas, hematite ($Fe_2O_3$) and the pre-reduction was done in one step. There was no recirculation of gas from the reactor in the pre-reduction. In this test a consumption of 660 kg coke and 495 $Nm^3$ oxygen gas per metric ton molten pig iron was obtained.

EXAMPLE 2

The input material was coke, oxygen, hematite and the pre-reduction was done in two steps without recirculation of gas from the reactor.

In the pre-reduction in two steps better use of the gas from the reactor is obtained. In this test a degree of pre-reduction of 80% was obtained and a consumption of 480 kg coke and 372 $Nm^3$ oxygen gas was obtained per metric ton molten pig iron.

EXAMPLE 3

The material consisted of coke, hematite, and the heat was provided by electrical energy. In this method according to the invention very small amounts of gas were obtained and therefore one could only achieve a reduction of 37% in the pre-reduction in two steps. Therefore it was preferable to carry out a trial with a pre-reduction in only one step and a pre-reduction of 33% was obtained.

In this test the combustion result was 215 kg. coke and energy consumption was 1 200 kWh per metric ton molten pig iron.

EXAMPLE 4

The input materials were as in Example 3, but the energy supply was successively replaced by oxygen and coke and at the same time the pre-reduction was expanded to two steps. In the extreme case without any electrical energy at all the same consumption figures were obtained per metric ton molten pig iron as in Example 2.

EXAMPLE 5

The input material in this test was coke, hematite, recirculation gas (in an amount so that a pre-reduction of 75% was obtained) the heat requirement was covered by electrical energy. Ca. 55% of the gas from the reactor was recirculated while the rest was used from pre-heating or drying of the ore concentrate.

In this test a coke consumption of 215 kg and an electrical energy consumption of 1 270 kWh per metric ton molten pig iron were obtained. The consumption figures are approximately equal to but possibly somewhat less satisfactory than those obtained in Example 3.

EXAMPLE 6

The input material was coke, hematite, filtered recirculation gas from the reactor and the heat was provided by electrical energy.

In this test a coke consumption of 161 kg and an electrical consumption of 610 kWh per metric ton molten pig iron were obtained.

EXAMPLE 7

In this test the input materials were hydrocarbon, coke, hematite and the heat was provided by electrical energy.

The coke can be replaced either entirely or partially by hydrocarbon but the reactor must in any case always be filled with coke to the normal tested level, on the one hand to guarantee a strong reducing environment, and on the other hand to obtain a pure reduction gas.

In this case oil was used as the hydrocarbon, but this could also be replaced by other hydrocarbons, even gaseous ones.

A consumption of 180 kg oil and an electrical energy consumption of 1 240 kWh were obtained per metric ton molten pig iron.

EXAMPLE 8

The input materials were propane, hematite, purified recirculation gas and the heat was provided by electrical energy.

All the recirculation gas was purified and recirculated to the process.

Per ton molten pig iron there was consumed 124 kg propane ($C_3H_8$) and electrical energy in an amount of 1 125 kWh.

The following is a composite table of the above 8 examples and it is evident therefrom that the procedure according to Example 3 would be the most favorable from the point of view of energy consumption.

Energy consumption with different processes according to the invention in the manufacture of molten pig iron.

| Ex. | Coke kg | Hydrocarbon kg | Oxygen $Mm^3$ | Electrical energy kWh | Rec. gas | Purified rec. gas | Pre-red. Number of steps |
|---|---|---|---|---|---|---|---|
| 1 | 660 | — | 495 | — | — | — | 1 |
| 2 | 480 | — | 372 | — | — | — | 2 |
| 3 | 215 | — | — | 1 200 | — | — | 1 |
| 4 | 216–480 | — | 0–372 | 0–1 200 | — | — | 2 |
| 5 | 215 | — | — | 1 270 | X | — | 2 |
| 6 | 101 | — | — | 610 | — | X | 2 |
| 7 | <30 | 180, oil | — | 1 240 | — | — | 2 |
| 8 | <30 | 124, propane | — | 1 125 | — | X | 2 |

The above experiments and tests were carried out in an experimental arrangement constructed in principals as shown in the drawing and it is to be taken for granted that the actual consumption figures in large-scale production will probably be higher than those given in the above table.

Even though the examples described above were only carried out for the production of pig iron, the man skilled in the art can easily see that, as was pointed out above, the method according to the invention can just as easily be applied to other oxidic ores.

What we claim is:

1. A method for producing liquid metal from metal oxides selected from the group consisting of oxides of tungsten, chromium, manganese, nickel, and iron and mixtures thereof by a first pre-reduction step and a final reduction and melting step, comprising;
   (a) as said pre-reduction step, contacting said metal oxides with outgoing reducing gases from step (d) to pre-reduce said metal oxides to a degree of pre-reduction of at least 33%;
   (b) feeding solid non-particulate reducing material to the top of a shaft furnace reactor to substantially fill said reactor;
   (c) heating the bottom of said reactor to at least the melting point of the metal being produced to supply sufficient heat energy to cover the heat demand for said final reduction and melting step; and
   (d) as said final reduction and melting step, blowing said pre-reduced metal oxides with a carrier gas through tuyeres into the bottom of said substantially filled reactor to contact said pre-reduced metal oxides with said solid reducing material to completely reduce said metal oxides and produce liquid metal and reducing gas.

2. A method according to claim 1, wherein the degree of pre-reduction is in excess of 90%, and wherein the method further comprises introducing an extra amount of reducing gas into the tuyeres to increase the amount of outgoing reducing gas from the reactor.

3. A method according to claim 1, wherein the pre-reduction step comprises forming a fluidized bed with the reducing gas from said reactor as a fluidizing medium, and subjecting said metal oxides to said fluidized bed.

4. A method according to claim 1, further comprising injecting slag formers along with the pre-reduced metal oxides at the bottom of said reactor.

5. A method according to claim 1, wherein the degree of pre-reduction is at least 60%.

6. A method according to claim 1, further comprising passing said reducing gas produced in step (d) through said reactor and exiting said gas from the top of said reactor prior to using said gas in said pre-reduction step.

* * * * *